United States Patent [19]

Perkins

[11] 4,304,812
[45] Dec. 8, 1981

[54] BACKCOATING OF OPEN WEAVE FABRIC

[75] Inventor: J. W. Perkins, Charlotte, N.C.

[73] Assignee: Celanese Corporation, New York, N.Y.

[21] Appl. No.: 189,280

[22] Filed: Sep. 22, 1980

[51] Int. Cl.³ .............................................. B65B 33/00
[52] U.S. Cl. .................... 428/247; 427/155; 428/229; 428/248; 428/252; 428/253; 428/262; 428/264; 428/265; 428/316.6; 428/913
[58] Field of Search ...................... 427/155, 259, 300; 428/245, 247, 253, 255, 260, 262, 290, 246, 252, 265, 310, 311, 315, 317, 248, 264, 229, 913

[56] References Cited

U.S. PATENT DOCUMENTS

| | | | |
|---|---|---|---|
| 3,527,654 | 9/1970 | Jones et al. | 117/66 |
| 3,713,868 | 1/1973 | Gordon et al. | 117/65.2 |
| 3,714,078 | 1/1973 | Gordon et al. | 260/2.5 L |
| 3,844,862 | 10/1974 | Sauer et al. | 156/78 |
| 3,845,182 | 10/1974 | Biskup et al. | 427/155 |
| 3,862,291 | 1/1975 | Brandon, Jr. et al. | 264/321 |
| 3,933,691 | 1/1976 | Lindemann | 260/2.5 L |
| 3,961,125 | 6/1976 | Suminokura et al. | 428/261 |
| 4,003,777 | 1/1977 | Eddy | 156/246 |
| 4,018,957 | 4/1977 | Werner | 428/141 |
| 4,039,707 | 8/1977 | O'Malley | 427/155 |
| 4,049,862 | 9/1977 | Lindemann | 428/265 |
| 4,049,870 | 9/1977 | Brockmann | 428/518 |

*Primary Examiner*—James J. Bell
*Attorney, Agent, or Firm*—Herbert P. Price; T. J. Morgan

[57] ABSTRACT

This invention provides a process for backcoating an open weave textile fabric without penetration by the backcoat medium to the face of the fabric.

The process involves applying a temporary protective coating to the face of the fabric, backcoating the fabric with a permanent polymeric layer, and then removing the protective coating with a solvent medium.

12 Claims, No Drawings

BACKCOATING OF OPEN WEAVE FABRIC

BACKGROUND OF THE INVENTION

Draperies are normally composed of one or more layers of textile fabrics. A lined drapery usually is composed of a high quality fabric with an incorporated design, and a lining which is a less expensive plain fabric. The lining protects the expensive fabric from sunlight exposure, improves the heat insulating properties of the drapery, and contributes additional weight which improves the hang properties of the drapery.

Because lined draperies are much more expensive than the unlined varieties, recently it has been proposed to achieve the advantages of a lining by coating the back of drapery fabric with a layer of synthetic polymer to provide a laminated fabric. However, many of the synthetic polymers employed for this purpose have not been satisfactory since the resultant laminated fabric has been deficient in one or more of light-fastness, abrasion resistance, good hand and dry-clean characteristics.

By and large these deficiencies have been moderated or eliminated by the more recent development of crushed foam-backed textile fabrics. This new type of laminated fabric is lightweight, opaque, color-fast, and exhibits good thermal and acoustical insulating properties for purposes of drapery applications.

One of the most serious difficulties encountered when backcoating textile fabrics is the striking through the interstices of open weave fabrics by a fluid polymeric medium during the coating application stage. A fabric is unacceptable if there is visible evidence of a heavy penetration of backcoat polymeric medium to the front surface of the fabric. As one alternative, casement fabric presently is being laminated to a sheet of non-woven fabric with a fusible adhesive, rather than being backcoated with a fluid polymeric medium. This alternative method has the disadvantage of being cost intensive.

Accordingly, it is an object of this invention to provide an economical method of backcoating open weave textile fabric without strike-through penetration of fluid polymeric medium to the fact of the fabric.

It is another object of this invention to provide backcoated casement fabric which exhibits excellent properties for drapery applications.

Other objects and advantages of the present invention shall become apparent from the accompanying description and example.

DESCRIPTION OF THE INVENTION

One or more objects of the present invention are accomplished by the provision of a process for backcoating an open weave textile fabric which comprises (1) applying a protective coating to the front of the fabric in the form of a resilient continuous film; (2) applying a flexible polymeric coating layer to the back of the fabric; and (3) contacting the coated fabric with a solvent medium which removes the protective coating from the face of the fabric.

In a more particular embodiment, this invention provides a process for producing a laminated open weave textile fabric having good hand and drape properties which comprises (1) applying a temporary protective coating to the front surface of the fabric in the form of a resilient continuous film of a water-soluble resin or gum; (2) coating the back surface of the fabric with a flexible layer of polymeric foam, and (3) contacting the coated fabric with an aqueous medium to remove the water-soluble protective coating from the face of the fabric.

Both the temporary protective coating on the face of the fabric and the permanent coating on the back of the fabric can be applied sequentially by the use of conventional coating techniques, such as brushing, spraying, knife over roll, roller coating, casting, knife over table, doctor blade over table, and the like.

The textile fabric employed as the fibrous substrate can be any type of woven, knitted, or nonwoven sheet material formed of mineral fibers, natural fibers of wool or cellulosic origin, synthetic fibers or filaments such as rayon, nylon, polyesters, polyolefins, and the like. The fabric normally will have a weight between about 2–16 ounces per square yard.

TEMPORARY PROTECTIVE COATING COMPONENT

The protective coating of choice is one that can be applied to the face of the fabric by conventional means to form a tough, resilient continuous film which adheres firmly to the fabric surface. Further, the coating must be amenable to removal by a solvent medium, which removal is selective and preferential without adversely affecting the permanent polymeric coating on the back of the fabric.

It is preferred that the protective coating is at least partially soluble in water, and susceptible to removal from the fabric when the coated fabric is contacted with an aqueous solution. Illustrative of suitable protective coating resins and gums are (1) a water-soluble cellulose derivative such as carboxymethyl cellulose or methyl cellulose; (2) a water-soluble starch derivative such as carboxymethyl starch or hydroxyethyl starch; (3) a water-soluble natural gum such as tragacanth gum or guar gum; (4) a water-soluble alginic acid derivative such as sodium alginate; (5) a water-soluble acrylic polymer such as polyacrylic acid, sodium polyacrylate or polyacrylamide; (6) a water-soluble polyvinyl alcohol or partially hydrolyzed polyvinyl acetate; (7) a water-soluble copolymer of styrene and maleic acid; (8) a high molecular weight polyethylene oxide having an average molecular weight of about 30,000 to about 2,000,000; and the like, and mixtures thereof.

Superior results can be achieved if the protective coating resin constituent is any of various water-soluble and water-dispersible polysaccharides containing adjacent cis hydroxyl groups, i.e., pairs of adjacent hydroxyl groups capable of hydrogen-bonding and cross-linking with a gelling agent to form a structural gel in an aqueous medium.

A particularly preferred class of polysaccharides are the polygalactomannan gums. This class of natural gums are polysaccharides composed principally of galactose and mannose units and are usually found in the endosperm of leguminous seeds, such as guar, locust bean, honey locust, flame tree, and the like. Guar flour, for example, is composed mostly of a galactomannan which is essentially a straight chain mannan with single membered galactose branches. The mannose units are linked in a 1-4-$\beta$-glycosidic linkage and the galactose branching takes place by means of a 1-6 linkage on alternate mannose units. The ratio of galactose to mannose in the guar polymer is, therefore, one to two. Guar gum has a molecular weight of about 220,000.

Locust bean gum is also a polygalactomannan gum of similar molecular structure in which the ratio of galactose to mannose is one to four. Guar and locust bean gum are the preferred sources of the polygalactomannans, principally because of the commercial availability thereof.

Polygalactomannan gums swell readily in cold water and can be dissolved in hot water to yield solutions which characteristically have a high viscosity even at a concentration of 1–1.5 percent. Guar gum and locust bean gum as supplied commercially usually have a viscosity (at 1% concentration) of around 1000 to 4000 centipoises at 25° C. using a Brookfield Viscometer Model LVF, spindle No. 2 at 6 rpm.

Also suitable are polygalactomannan gums which have been derivatized by substitution of hydroxyl groups by ether groups. Generally the preferred polygalactomannan ether derivatives are those which have a degree of substitution up to about 1.0.

By the term "degree of substitution" as employed herein is meant the average substitution of ether groups per anhydro sugar unit in the polygalactomannan gums. In guar gum, the basic unit of the polymer consists of two mannose units with a glycosidic linkage and a galactose unit attached to a hydroxyl group of one of the mannose units. On the average, each of the anhydro sugar units contains three available hydroxyl sites. A degree of substitution of one means that one third of the available hydroxy sites have been substituted with ether groups.

Illustrative of polygalactomannan ether derivatives are those which are substituted with ether groups which include alkoxy, hydroxyalkyl, carboxyalkyl, aminoalkyl, haloalkyl, and the like.

Depending on other factors which might affect solution viscosity, the quantity of polysaccharide (e.g., polygalactomannan gum) employed in the aqueous solution on the average will vary in the range between about 0.1–2 weight percent, based on the total solution weight.

The gelling agent employed for the formation of the structural gel coating preferably is selected from water-soluble compounds which release borate ions in solution. Illustrative of suitable borate gelling agents are compounds described in U.S. Pat. No. 3,215,634 such as boric acid, calcium metaborate, potassium metaborate, potassium tetraborate, sodium tetraborate, sodium metaborate tetrahydrate, sodium tetraborate tetrahydrate, sodium tetraborate decahydrate, and the like. Sodium tetraborate decahydrate is sold commercially as borax.

Boric acid is a preferred borate gelling agent for the formation of the protective coating film because of its ready availability and low cost, and its effectiveness at low concentrations. The borate gelling agent is employed in a quantity between about 0.5–10 weight percent, and preferably between about 1–5 weight percent, based on the weight of polysaccharide component in a given aqueous solution. The optimal quantity of borate gelling agent to be employed is determined by such factors as the particular species of borate gelling agent selected, the quantity of polysaccharide involved and its specific susceptibility to crosslinking interaction with the borate ions in solution.

An important aspect of the application and gelling of the protective coating is the control of pH in the aqueous solution being employed. Thus, it is essential that initially the pH of an aqueous solution which contains both a polysaccharide and a borate gelling agent is acidic, i.e., a pH below about 7. The said pH preferably is in the range between about 2–6.5, and most preferably is in the range between about 3–6.

Subsequently, the pH of the applied polysaccharide coating is adjusted into the alkaline range, i.e., a pH above 7, and most preferably a pH in the range between about 8–11. The adjustment of pH can be readily accomplished by spraying the applied coating with ammonium hydroxide solution, or by exposing the coating to ammonia vapor. When the pH of the applied coating becomes alkaline, the coating converts into a continuous structural gel film which is tough and elastic and adheres securely to the fabric substrate.

In the case when a fabric has a very open weave construction (e.g., a casement fabric having $3/32'' \times \frac{1}{4}''$ openings), it is advantageous to pre-foam the protective coating fluid medium before applying it to the face of the fabric. For example, the solution can be air-frothed to a blow ratio of about 3:1 to about 15:1, and, preferably, a blow ratio of about 4:1 to about 7:1. Blow ratio is defined as the ratio of the weight of a specified volume of coating solution before being foamed, divided by the weight of the same volume of solution after being foamed. The blow ratio is determined by weighing a portion of the coating solution in a container, foaming the solution, filling the same container with the foam and determining the weight of the foam. A surfactant such as alkylphenoxypolyethoxyethanol or alkylaryl sulfate can be included in the coating medium to aid in forming a stable foam. A surfactant such as sodium cetyl stearyl sulfate can also be incorporated in the coating medium to assist in window paneing of the voids in the fabric substrate. The foamed coating is applied to the fabric at a wet thickness of about 25 to about 100 mils.

It is highly preferred that the temporary protective layer (e.g., a gelled foam) is not permitted to dry to any substantial degree before backcoating is applied to the fabric. For example, if the temporary protective coating is a gelled foam of guar gum, any large loss of the water content of the gelled gum would adversely affect the dimensional stability of the coating film, and shrinkage could cause the film to crack and become non-continuous. The protective coating would then be less effective in preventing strike-through penetration during the backcoating operation.

Permanent Backcoat Component

The vehicle for producing the flexible coating layer on the back of the fabric can be selected from any of a large number of stable polymeric dispersions known and used for binding, coating, impregnating or related uses, and may be of a self crosslinking type or externally crosslinked type. The polymeric constitutent can be an addition polymer, a condensation polymer or a cellulose derivative. Illustrative of suitable coating vehicles are foamed or unfoamed organosols, plastisols, latices, and the like, which contain one or more polymeric constituents of types which include vinyl halides such as polyvinyl chloride, polyvinyl chloride-polyvinyl acetate and polyethylene-polyvinyl chloride; polymers and copolymers of vinyl esters such as polyvinyl acetate, polyethylene-polyvinyl and polyacrylic-polyvinyl acetate; polymers and copolymers of acrylate monomers such as ethyl acrylate, methyl acrylate, butyl acrylate, ethylbutyl acrylate, ethylhexyl acrylate, hydroxyethyl acrylate and dimethylaminoethyl acrylate; polymers and copolymers of methacrylate monomers such as methyl methacrylate, ethyl methacrylate, isopropyl methacrylate and butyl methacrylate; polymers and copolymers of acrylonitrile, methacrylonitrile, acrylamide, N-isopropylacrylamide, N-methylolacrylamide and methacrylamide; vinylidene polymers and copolymers such as polyvinylidene chloride, polyvinylidene chloride-polyvinyl chloride, polyvinylidene chloride-polyethyl acrylate and polyvinylidene chloride-polyvinyl chloride-polyacrylonitrile; polymers and copolymers of olefin monomers including ethylene and propylene as well as polymers and copolymers of 1,2-butadiene, 1,3-butadiene, 2-ethyl-1,3-butadiene, and the like; natural latex; polyurethanes, polyamides; polyesters; polymers and copolymers of styrene including styrene, 2-methylstyrene, 3-methylstyrene, 4-methylstyrene, 4-ethylstyrene, and 4-butylstyrene; phenolic emulsions; aminoplast resins and the like.

Of the various coating media, the polymeric foams are one of the preferred types. Illustrative of polymeric foams are those described in U.S. Pat. Nos. 3,527,654; 3,713,868; 3,714,078; 3,862,291; and 3,933,691, and references cited therein.

A typical coating medium is the crosslinked foamed copolymer of styrene/acrylic acid latex disclosed in U.S. Pat. No. 3,215,647. Another type of suitable foamed medium is that derived from vinyl plastisols. The polymer constituent in a vinyl plastisol is usually polyvinyl chloride in the form of small particles intimately admixed with a plasticizer. The plastisols are quite fluid, and can be gelled by heating.

As in the case of latex foam, gas may be supplied by mechanically dispersing the gas into the plastisol or by decomposition of a chemical agent such as an azo compound. In the mechanical process, gas is introduced into the chilled plastisol while it is under pressure. In some cases, certain solvent-soluble surfactants may be added to the plastisol compound and serve as frothing or foaming agents when gas is injected in the system. Silicone surfactants may be used for this purpose. Then the plastisol and dissolved or dispersed gas is extruded through a tube. As the pressure is released, the gas expands to form interconnecting voids. Then the plastisol is gelled by oven heating, e.g., at 360° F.

In a chemical foaming process, a plastisol is mixed with a chemical agent which decomposes when heated. Various agents of this type are available, each having a characteristic decomposition temperature. The agent for any particular system should have a decomposition temperature below the gel temperature of the plastisol. An unfoamed mixture of plastisol and chemical agent is coated onto a fabric and then heated in an oven. The heat in the oven causes the chemical agent to decompose, resulting in foaming, and this is followed by gelation as heating continues.

Similarly, flexible polyurethane foam formulations may be employed. These usually are obtained from a polyester or a polyether, a polyisocyanate and water and/or a volatile inert liquid. Foaming is produced with carbon dioxide generated by the polyisocyanate and water or by the evaporation of the volatile inert liquid.

The foams normally contain fillers or pigments which provide opaqueness and an ornamental effect. Suitable inert, inorganic materials include clay, talc, silica, carbon black, asbestos, glass, mica, calcium carbonate, antimony oxide, and the like. Organic fillers include the various polymers, copolymers and terpolymers of vinyl chloride, vinyl acetate, acrylonitrile, acrylamide, styrene, ethylene, propylene, butadiene, divinylbenzenes, and the like. Other additives which may be included are plasticizers such as dioctylphthalate and di(2-ethylhexyl) adipate, extenders, softeners, and emulsifiers.

After the fluid foam medium is spread on the back surface of the fabric, the thin layer of foam is dried or gelled, and when appropriate, cured to form a permanent continuous backcoat layer which is laminated to the fabric. If desired, the foam may be compressed or calendered into a flattened condition after gelling but prior to curing. Also, embossed patterns or crushed effects may be added before the cure step.

The thickness of a backcoat layer will average in the range of about 50 to about 250 mils wet thickness and preferably about 40 to about 120 mils. Depending on the thickness of the coating and the type of polymer system involved, curing can be accomplished by exposing the coating to a temperature between about 220°–320° F. in a forced draft oven for a period between about 1–30 minutes.

After the backcoat has been cured to form a permanent laminate with the fabric sibstrate. The laminate is subjected to a washing step with a solvent to remove the temporary coating which protects the face side of the fabric. For example, if the protective coating is a film of a polygalactomannan gum which has been gelled with a borate gelling agent under alkaline conditions, then the film removal is accomplished by washing with slightly acidic water.

Thereafter, the backcoated fabric can be subjected to further treatment, such as with a durable crease crosslinking resin or other finishing agents.

A hardenable aminoplast is a preferred type of durable crease crosslinking resin. As described in U.S. Pat. No. 3,527,654, a hardenable aminoplast is exemplified by carbamide and melamine precondensates which are either water soluble or of limited water solubility and which are obtained by the condensation of formaldehyde or other aldehydes or ketones with compounds such as, for example, urea, thiourea, cyanamide, dicyandiamide, cyclic ethylene urea, biguanide, melamine, formamide, formoguanamine, ethyl carbamate, acetoguanamide, triazones, and the like, and mixtures of such compounds, as well as their alkyl and acyl derivatives. Subsequent methylation or other modification of the resulting N-methylol compounds or triazones often be beneficial. Especially good results are obtained by the use of N,N'-dimethylol cyclic ethylene urea and various other condensation products of formaldehyde with urea.

The amount of the crosslinking resins used varies with the type of fabric and the use intended. About 4–25% by weight of the laminated fabric, including the textile layer and the backcoat layer, is preferred. Especially good results are obtained when the solids pick-up is about 12%. The aminoplasts or other crosslinking resins are applied from aqueous solutions or dispersions which may include various other materials normally used with them. For example, the material may contain various softeners such as emulsified polyethylene, glycerol monostearate and the like. They may also contain a water repellent silicone, and a catalyst for curing the crosslinking resin. Typical catalyst for crosslinking agents are formic, hydrochloric or sulfuric acids, maleic anhydride and the like.

Subsequently, the fabric is dried, preferably at a temperature of 200°–400° F. for about 30 seconds to 5 minutes, and then it is cured. The cure temperature may be as high as 800° F. for a flash cure, but ordinarily is about 200°–400° F. for about 30 seconds to 6 minutes. Preferred conditions are about 2 minutes at 340° F.

Preferably the laminated fabric is then subjected to a final compressive shrinkage treatment. The term compressive shrinkage refers to the known process normally used to provide dimensional stability and to prevent further shrinkage during laundering of fabrics. The process is described in detail in the American Cotton Handbook (second edition), 1949, and in United States patents which include U.S. Pat. Nos. 1,861,442; 1,861,423; 1,861,424; 1,944,001; 2,078,528; 2,082,981; 2,084,367; 2,450,022; and 2,721,370.

In this process, the fabric is passed through an apparatus known as a compressive shrinkage range. In one form of apparatus used in the process, a thick blanket is passed over a relatively small diameter roller and then around a large drum. The path of the blanket is S-shaped so that one surface of the blanket is turned out as the blanket passes over the small roller and then turned in to lie against the drum. The blanket may be, for example, a thick pile fabric. As it passes over the small roller, the outer edges of the tufts of the blanket are spread apart. Then, as it turns against the drum, the tips of the tufts come back together again. The fabric which is to be compressively shrunk is laid on the blanket when the tufts are spread apart. As the tufts come together again, the fabric is caused to shrink to conform to the reduced surface area of the outer face of the blanket. The fabric at this point is against the drum, and consequently there is a mechanical compression of the fabric in the machine direction which has the effect of mechanically-induced shrinkage.

The following example is further illustrative of the present invention. The components and other specific ingredients are presented as being typical, and various modifications can be derived in view of the foregoing disclosure within the scope of the invention. Parts and percentages are parts and percentages by weight unless otherwise indicated.

EXAMPLE

| TEMPORARY PROTECTIVE COATING COMPONENT | |
|---|---|
| Soap Pre-Mix* | 6.5 parts |
| Water | 92.0 parts |
| Boric Acid | 0.2 parts |
| Hydroxypropyl Guar (D.S.-0.5) | 1.2 parts |
| Acetic Acid (56% in water) | 0.1 parts |
| *Soap Pre-Mix | |
| Sodium Cetyl Stearate Sulfate | 7.7 parts |
| Dihexyl Ester of Sodium Sulfosuccinic Acid | 15.4 parts |
| Water | 76.9 parts |
| BACKCOATING COMPONENTS | |
| Acrylic Emulsion** | 62.42 parts |
| Water | 4.87 parts |
| Clay | 15.83 parts |
| Titanium Dioxide | 8.53 parts |
| Ammonium Hydroxide (28% in water) | 0.24 parts |
| Sodium Octadecylsulfosuccinamate | 0.35 parts |
| Ammonium Stearate (33% in water) | 2.58 parts |
| Hexamethoxymethylmelamine | 0.24 parts |
| Oxalic Acid (10% in water) | 0.24 parts |
| Water | 4.32 parts |
| Sodium Polyacrylate (13% in water) | 0.38 parts |

**Acrylic Emulsion is a copolymer of 34.9% methyl acrylate, 62.1% ethyl acrylate, 1% itaconic acid and 2% N-methylol acrylamide at 46% solids in water.

PROCEDURE

The Temporary Protective Coating Component is prepared by mixing the ingredients in the order shown. The acetic acid is added in the amount needed to adjust the pH to 5.5. The Component is foamed by agitation with air to a blow ratio of 5.1. Using shims (50 mils thick) for the adjustment of the coating thickness, the face side of an open weave fabric is coated with the foamed Temporary Protective Coating Components using a doctor blade as the applicator, followed immediately by the exposure of the coated fabric to dilute ammonium hydroxide spray to gel the coating. The fabric is then turned over so that the gelled coating is resting on a mat moistened with dilute ammonium hydroxide. The back of the fabric is then coated with the Backcoating Component foamed to a blow ratio of 8:1. The coating is applied to a wet thickness of 50 mils. The fabric is then dried, crushed, cured and washed. Drying conditions are 3 minutes at 250°F. in a forced air oven, followed by crushing, and then curing for 3 minutes at 325° F. in a forced air oven. The fabric is washed with acidic water (pH 5-6) to remove the Temporary Protective Coating.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for backcoating an open weave textile fabric which comprises (1) applying a protective coating to the front of the fabric in the form of a resilient continuous film; (2) applying a flexible polymer coating layer to the back of the fabric; and (3) contacting the coated fabric with a solvent medium which removes the protective coating from the face of the fabric.

2. A process for producing a laminated open weave textile fabric having good hand and drape properties which comprises (1) applying a temporary protective coating to the front surface of the fabric in the form of a resilient continuous film of a water-soluble resin; (2) coating the back surface of the fabric with a flexible layer of polymeric foam, and (3) contacting the coated fabric with an aqeuous medium to remove the water-soluble resin film from the face of the fabric.

3. A process in accordance with claim 2 wherein the temporary protective coating in step (1) is a gelled foam of a hydrocolloid gum.

4. A process in accordance with claim 2 wherein the temporary protective coating in step (1) is a gelled foam of a polygalactomannan gum.

5. A process in accordance with claim 2 wherein the temporary protective coating in step (1) is a gelled foam of guar gum.

6. A process in accordance with claim 2 wherein the temporary protective coating in step (1) is gelled foam of locust bean gum.

7. A process in accordance with claim 2 wherein the polymeric foam layer in step (2) is densified by the application of pressure.

8. A process in accordance with claim 2 wherein the polymeric foam layer in step (2) is a polyacrylic foam.

9. A process in accordance with claim 2 wherein the polymer foam layer in step (2) is subsequently cured.

10. A laminated open weave textile fabric produced by the process of claim 2.

11. A laminated open weave textile fabric produced by the process of claim 2, wherein the fabric is durable crease treated.

12. A laminated open weave textile fabric produced by the process of claim 2, wherein the fabric is compresively shrunk.

* * * * *